Apr. 10, 1923.
J. MORRISON
VEHICLE BODY AND THE LIKE
Filed Nov. 25, 1921
1,451,626
2 sheets-sheet 1
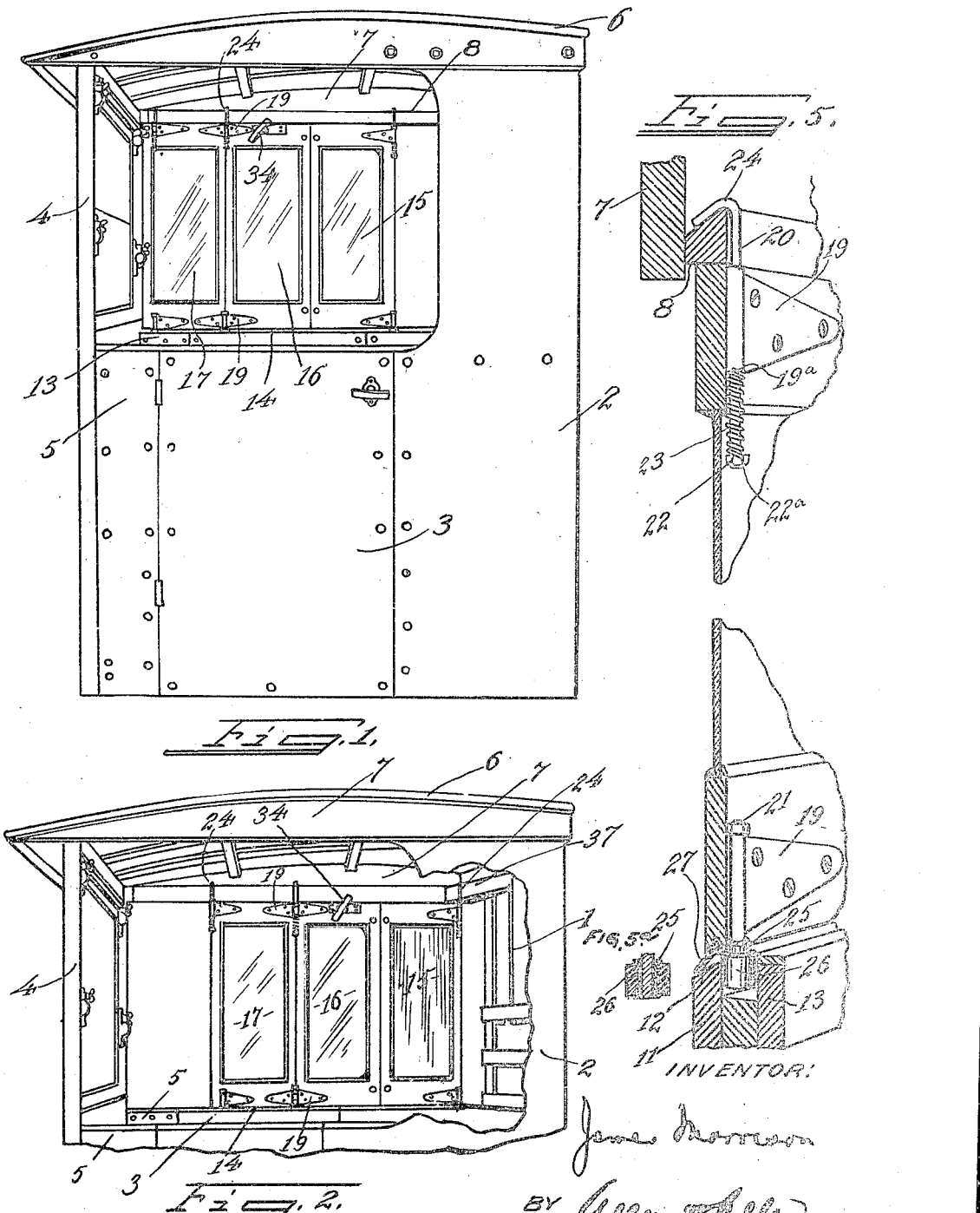
INVENTOR:
James Morrison
BY
ATTORNEYS.

Apr. 10, 1923. 1,451,626
J. MORRISON
VEHICLE BODY AND THE LIKE
Filed Nov. 25, 1921   2 sheets-sheet 2
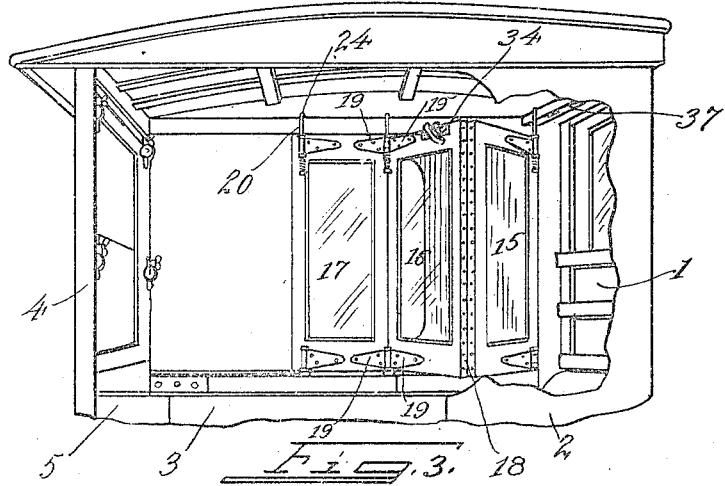
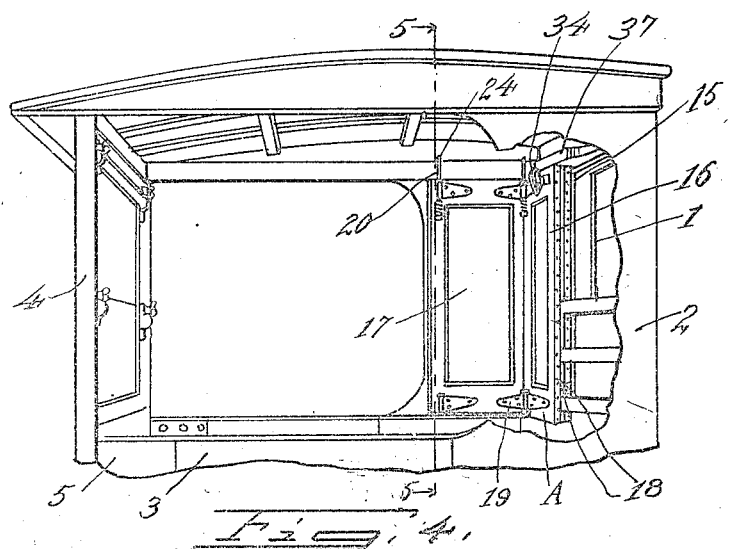
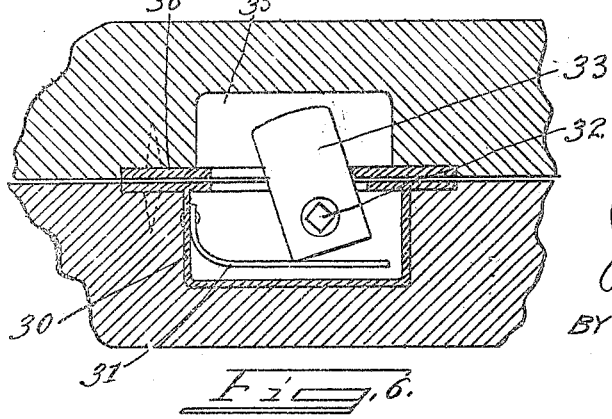
INVENTOR.
James Morrison
BY Allen & Allen
ATTORNEYS.

Patented Apr. 10, 1923.

1,451,628

UNITED STATES PATENT OFFICE.

JAMES MORRISON, OF CINCINNATI, OHIO, ASSIGNOR TO THE HIGHLAND BODY MANUFACTURING COMPANY, OF CINCINNATI, OHIO, A CORPORATION OF OHIO.

VEHICLE BODY AND THE LIKE.

Application filed November 25, 1921. Serial No. 517,487.

*To all whom it may concern:*

Be it known that I, JAMES MORRISON, a citizen of the United States, and a resident of Cincinnati, in the county of Hamilton and State of Ohio, have invented certain new and useful Improvements in Vehicle Bodies and the like, of which the following is a full, clear, and exact description, reference being had to the accompanying drawings, forming part of this specification.

My invention relates to the provision of side windows for closed body vehicles, although it may have wider application in the vehicle art, as will be apparent from the specification.

In the provision of closures for the sides of automobile bodies, the usual procedure has been to supply either flexible side curtains, which are demountable, or stored in some manner in the top or rear of the vehicle body, or to provide fixed window frames, in which sliding windows are placed.

The defect in the flexible curtain arrangements is that such curtains have a very limited life, and the glazing material soon becomes clouded. Also the manipulation of such curtains is an annoyance, in spite of the multitude of efforts in the art to make it easy, and the protection against influx of air and weather is poor.

The defects in the fixed window frame, sliding window system are the expense of the frames, the fact that the ventilation through them is not easy and that the frames obstruct vision, and the full flow of air desired in warm weather. In commercial vehicles, such as closed cab trucks, the windows are in the way and likely to be broken.

It is the object of my invention to provide a rigid, glass lighted window for the above purposes, and to make it adjustable and collapsible, so that a permanent, full vision window with full weather protection is provided which yet permits variations in adjustment, and a folding-up for safe storage, without requiring a demountable arrangement. More particularly I employ for the side windows of closed body vehicles, glass lighted sashes, which have a combined folding and sliding action and a plurality of positions of adjustment when fully extended without folds.

These objects and attendant advantages of structure to be hereinafter noted, I accomplish by that certain construction and arrangement of parts to be hereinafter more specifically pointed out and claimed.

In the drawings,

Figure 1 is a perspective view of a closed motor truck cab, with one of the new side window devices fully extended in closed position and the one facing the observer entirely retracted and stored.

Figure 2 is a like view to Figure 1 with part of the cab broken away and the window showing withdrawn to partially open position.

Figure 3 is a like view to Figures 1 and 2, showing the window in the act of folding and sliding toward storage position.

Figure 4 is a like view showing the window in storage position.

Figure 5 is a detail, vertical section showing a perspective taken on the line 5—5 of Figure 4.

Figure 5ª is a detail section of the guide roller.

Figure 6 is a detail section taken lengthwise of the vehicle showing the latch device.

Referring briefly to the surrounding part of my device, I show a cab having a back 1, side panels 2, 2, extending forwardly from said back, doors 3, 3, and a closed front 4, including a wind-shield. The doors are preferably hinged to pillars 5, 5, at both sides of the front, and the cab has a top 6, which has depending side portions 7, 7, extending the full length from the back of the cab to the wind-shield, and constituting the roof rail. The doors may be held in any desired way, sliding into a well in the side panels or hinged as shown.

Mounted along the said roof rails 7, 7, of the top are triangular mounting and supporting strips 8, 8, for my novel window devices. These strips are screwed to the said boards 7, 7. The angle of strips 8, 8, brings the apex of the triangle away from the boards 7, 7.

Mounted along the side portions 2 of the cab, at the level of the top of the doors, are strips 11, having beveled crests 12, and interspaced strips 13, which together form a channel. The tops of the doors themselves are equipped with strips 14 corresponding with and forming extensions of the strips 11, when the doors are closed. The bevels on the strips 11 and 14 face outwardly of the cab. The hinge pillars 5, 5, are provided with short, interspaced pieces 11 and 13, as in the case of the sides 2.

Except for latch sockets in the portions 8 of the top strips, the above are substantially all the fittings to be carried by the vehicle cab.

The windows are formed in the example shown of three sections, although following the same principles, the number of sections could be extended. I prefer a good sized window glass in my cabs, because of the improved vision produced thereby, and the reducing of the size of glass and increasing of numbers of the sections is not preferred by me.

Thus I show a rear section 15, a central section 16, and a forward section 17, each formed of a wood or metal frame, suitably glazed with a sheet of glass. The central section and rear section are secured hingedly together by means of a "piano" hinge 18, which is a type of hinge having leaves extending the full length of the objects to be coupled, and a long pintle, with nothing exposed when the parts are closed but the leaf knuckles. This hinge flexes inwardly of the vehicle cab. (Figure 3.)

The central section and front section are coupled together by hinges having leaves 19, 19, at top and bottom of both sections, and special pintles 20 for the top leaves, and 21 for the bottom leaves.

The leaves 19 and pintles 20 and 21 are also used at the forward end of the front section and the rear end of the rear section.

The entire window section, when extended, reaches from the wind-shield frame at the front of the cab to the side portions thereof. It preferably does not extend clear to the back of the cab, when in full closed position, the result of this being that when fully extended, the window device may be set in various positions (Figure 2), which will give desired ventilation.

Referring next to the special hinge pintles. The pintles 20 extend below the hinge leaves where they are mounted and are equipped with nuts 22 at their lower ends. Over the pintle extensions are placed left hand wound springs 23, which bear against the nuts and lock them in place, and which press down on the pintles. The nuts and leaves 19 are notched at 19ᵃ and 22ᵃ to receive the ends of the springs.

The upper ends of the pintles are extended and bent to form hooks 24, which ride on the triangular top strips hitherto mentioned. (Figure 5.)

Thus in the example shown, there are three of the hook ended pintles engaging over the supporting rail, two on the front section and one on the rear section. The window sections bear up against the base of the body 8 of the supporting rails, and the springs on the pintles force the sashes upwardly into a non-rattling, tight, but sliding engagement. The bottom pintles 21 are extended below the hinges, where they are equipped with bushings 25, which retain rubber rings 26, the same being preferably small sections of thick rubber hose. The rubber faced rollers thus produced, ride in the channels formed between the strips 11 and 13 at the hinge pillars 5, and at the sides 2 of the cab, but they do not engage the doors except on the inside of the strips 13 thereon.

Each section of the window devices is equipped with a flexible wiping strip 27, which when the windows are fully extended, and held in place, will naturally snap over the bevels on the strips 11 and 13, thereby forming an overlapping weather-proof joint.

I provide a latch or lock device for holding the window in place, and for holding the central section straight with the balance of the window.

In the central section I place a latch socket piece 30, into which is set a spring strip 31, that extends across the base of the socket. A pin 32 mounted across this socket is equipped with a latch 33 of substantially rectangular shape. The pin itself extends out on the inside of the window sash, where it is provided with a handle 34, which should be of a size sufficient to use it to manipulate the entire window.

In the body 8 of the supporting rail, at the desired points, one of which should be such that it would hold the window jammed up against the frame of the wind-shield, are a series of sockets 35, faced by plates 36. Also a rail 37 along the back of the cab is equipped with a like socket and plate.

The window when in position for latching is held fast by swinging the handle of the latch plate 33, and thus bringing the plate into a vertical position. As it comes to vertical position, it will force the window forwardly up against the wind-shield frame, as above noted, due to the position of the plate. When the latch 33 is in vertical position (fully locked), the spring in the latch socket will hold it fast. Also when the latch is withdrawn to unlocked position, the spring will enforce and maintain a horizontal, non-rattling position.

In use, the window is operated as follows: Taking first the entirely withdrawn condition, the rear section is folded or swung on its pintles 20, 21, which are at that time close up against the back of the cab, into the position indicated at A, Figure 4, and under the rail 37. The central section is folded back flat against the rear section and held in place with the latch engaging in the socket in the rail 37. The front section is concealed behind the side panel 2, with the two pintles 20 engaging the triangular rail, and the two rubber rollers lying in the channel between the strips 11 and 13.

This position is non-rattling, and entirely removed from view outside of the vehicle. On the inside of the vehicle it is sufficiently out of the way to suffer but little danger of breakage, since it does not overhang the seat.

To close the window, the latch is released by rocking the handle 34, and the operator then pushes the handle and pulls on it to slide the forward sash ahead and flex the hinge of the central and rear sections and swing the rear sections around on its pintles 20 and 21, until all three sashes are in a straight line, with the rear sash still behind the side panel of the cab. In this position, the window may be locked (Figure 2), there being a latch socket provided at this point.

To entirely close the window, the latch is released and the front section drawn along to the front of the cab, when its rollers will enter the front channel and the rear section will just overlap the side panel, and the central section overlies the door. The parts will then be latched again, with the attendant jamming of the entire window forward. The entire operation is done in each instance by a mere manipulation of the handle 34.

I am advised of the practice of providing doors and shutters, which have two panels hinged together which are swung into a parallel relation to withdraw them from obstruction of an opening, but am not advised of any such instance in which there is a sliding motion of the parts, or where more than two sections are involved. Two sections of a window or door, without a slide, would be insufficient for motor vehicles. It is obvious, however, that the front section of the window above described could be done away with entirely and an effective structure retained, and also that more sections of folding nature could be introduced between the central and front sections. Also the rear section might have no sliding function but remain at all times in fixed pivotal position.

I have described in some detail the mounting plan and fittings of my windows, because I conceive these to be well devised for simplicity, economy and strength. I do not wish this to be construed, however, as a limitation of my claims that follow beyond the usual range of constructive equivalents to the parts named.

Having thus described my invention, what I claim as new and desire to secure by Letters Patent, is:—

1. In a vehicle window device, the combination with a rectilinear support, of a window in a plurality of articulated sections, a part at least of said sections adapted to fold together into side by side relation, all of the sections being mounted on the support so as to slide thereon, and to permit the said folding, said support being longer than the total length of the sections, whereby the entire window when in fully aligned relation may be slid as a unit on the support.

2. In a vehicle window device, the combination with a rectilinear support, of a window in a plurality of articulated sections, a part of said sections at least adapted to fold together into side by side relation, all of the sections being mounted on the support so as to slide thereon, and to permit the said folding, said support being longer than the total length of the sections whereby the entire window when in fully aligned relation may be slid as a unit on the support, and means for securing the sections in desired positions along the support when in a straight line with each other.

3. In a vehicle window device, the combination with an overhead support, of a window in a plurality of articulated sections, adapted to fold together into parallel relation, said sections being suspended on the support so as to slide thereon, and to permit the said folding and means for resiliently holding the articulated sections against the base of said overhead support.

4. In a vehicle window device, the combination with a support, of a window formed of three articulated sections, at least, two of the sections being adapted to fold into parallel relation with each other, and the third held at all times aligned with the support, said sections being so mounted on the support as to slide as a body when moved into alignment with each other, with the third section located forwardly of the vehicle and the support being longer than the total length of the sections, whereby the entire window when in fully aligned relation may be slid as a unit on the support.

5. In a vehicle window, the combination in a closed body, of a side panel toward the rear thereof, a top having a depending member, a rail or the like on said depending member, and a window of three articulated sections, at least, said sections adapted to slide on the rail, and the rear two sections to fold together, with the front section of a size to lie behind the side panel when the rear two sections are folded together against the rear of the body.

6. In a vehicle window, a support, a window on said support, comprising a forward section to slide along said support, but not swing thereon, an articulated section connected thereto, adapted upon flexing of the connecting means to swing inwardly of the vehicle and lie flat against the back thereof, and means for slidably mounting the articulated section on the support.

7. In a vehicle window, a support, a window on said support, comprising a section to slide along said support but not swing thereon, a pair, at least, of articulated sections, adapted upon flexing of the connecting means to swing inwardly of the vehicle and lie flat against each other and against the back of the vehicle, and means for hinging the forward end of the articulated pair to the sliding section, said support comprising an overhead linear member, of a length to permit all of the sections to slide thereon when in line, and the rearmost section of the said pair adapted to pivot also on said support.

8. In combination with a linear overhead support, means for mounting a pair of window sections thereon, comprising a hinge between the two sections, said hinge having a pintle, slidably engaging the support, and spring means engaging the window and the pintle to retain the support and window together and prevent dislodgment of the pintle.

9. In combination with a vehicle body, a rail mounted adjacent the top thereof, and having a ridge sloping inwardly and upwardly from the top, a window sash, a mounting device on the sash, a pin resiliently and slidably held in the mounting device, and means on said pin to engage over the ridge, for the purpose described.

10. The combination with a vehicle body having a side portion with a window opening therein, of a rail presenting a supporting ridge for a window mounted in the vehicle side above the opening, and a window of articulated sections, the front section having a plurality of interspaced means of engagement with said ridge permitting a sliding motion thereof, only the middle section having a hinged relation to the rear and front sections, and the rear section having a single means of engagement with said ridge, permitting a sliding and folding action thereof.

11. The combination with a vehicle body having a side portion with a window opening therein, of a rail presenting a supporting ridge for a window mounted in the vehicle side above the opening, and a window comprising sections and a hinge between the sections, said hinge having a pintle equipped with means adapted to hook over the ridge, said pintle extending below the hinge, and a spring thereon engaging the pintle to thrust it downwardly and the window upwardly.

12. The combination with a vehicle body having a side portion with a window opening therein, of a rail presenting a supporting ridge for a window mounted in the vehicle side above the opening, and a window comprising sections and hinged between the sections, said hinge having a pintle equipped with means adapted to hook over the ridge, said pintle extending below the hinge, a nut with a notched face on the end of the pintle, and a spring having a left hand winding to lock the nut, engaging between the hinge and the nut and lying over the pintle.

13. The combination with a vehicle body having a side portion, with a window opening therein, a supporting rail over said opening, a channel forming device at the level of the lower end of the opening, extending rearwardly from the opening, and a window comprised of articulated sections and having forward and rearward means adapted to engage and slide along the rail and means on the forward window section for engaging in said channel and adapted to make its engagement when the window is arranged with two sections, at least, folded together and swung inwardly of the body, leaving the forward section lying parallel with the vehicle side and rearwardly of the window opening.

14. In a vehicle window device, the combination with a support, of a window in a plurality of articulated sections, a part of said sections at least adapted to hold together into side by side relation, all of the sections being mounted on the support so as to slide thereon, and to permit the said folding, said support being longer than the total length of the sections, whereby the entire window when in fully aligned relation may be slid as a unit on the support, and means for securing the sections in desired positions along the support when in a straight line with each other, said means being located adjacent the juncture of the folding sections to hold them in alignment.

15. In a vehicle window device, the combination with a support, of a window in a plurality of articulated sections, and said support being substantially longer than the total width of the sections, so that they may slide as a unit thereon when fully extended, and locking means on one of the sections at least, adapted to engage the support and lock the window thereto against movement, said locking means being located so that it will not engage the support unless the window is in fully extended position.

16. In a vehicle window device the combination with a vehicle cab having a side opening, and a side panel rearwardly of said opening, a rectilinear support extending along the said opening, a window mounted from said support and adapted to slide along the support as a unit, said window formed of a plurality of articulated sections, same being so articulated that the window will move and fold into a position behind the said side panel, and the total width of said sections being such as to close off the side opening from the side panel to the front of the said cab or body.

17. In a vehicle window device the combination with a vehicle cab having a side opening, and a side panel rearwardly of said opening, a rectilinear support extending along the said opening, a window mounted from said support and adapted to slide along the support as a unit, said window formed of a plurality of articulated sections, same being so articulated that the window will move and fold into a position behind the said side panel, and the total width of said sections being such as to close off the side opening from the side panel to the front of the said cab or body, and a locking means for the window adapted to engage the support and force the window upon such engagement into a position of true alignment in its fully extended position.

18. In combination with a linear overhead support along the side opening of a vehicle cab, means for mounting a window section thereon, comprising a hinge leaf, a pintle for said hinge-like leaf adapted to engage said overhead support, and a spring mounted over said pintle and adapted to engage the hinge-like leaf, and a stop element on the pintle also engaging said spring, whereby a resilient pressure between the pintle stop and the hinge-like leaf is established.

JAMES MORRISON.